United States Patent

[11] 3,529,575

| [72] | Inventor | Thomas G. Schalk |
| | | Kalamazoo, Michigan |
| [21] | Appl. No. | 715,361 |
| [22] | Filed | March 22, 1968 |
| [45] | Patented | Sept. 22, 1970 |
| [73] | Assignee | The Upjohn Company |
| | | Kalamazoo, Michigan |
| | | a corporation of Delaware |

[54] ANIMAL DRINKING BOTTLE
7 Claims, 6 Drawing Figs.

[52] U.S. Cl. .................................................... 119/72.5, 119/18
[51] Int. Cl. ...................................................... A01k 7/00
[50] Field of Search ........................................... 119/18, 72.5, 75, 71

[56] References Cited
UNITED STATES PATENTS

| 2,653,569 | 9/1953 | Forester ...................... | 119/18 |
| 3,397,676 | 8/1968 | Barney ........................ | 119/18X |
| 3,410,249 | 11/1968 | Allen et al. .................. | 119/72.5X |

*Primary Examiner*—Hugh R. Chamblee
*Attorneys*—Woodhams, Blanchard and Flynn, and Eugene O. Retter and Talivaldis Cepuritis

ABSTRACT: An upwardly opening container having a downwardly and sidewardly extending pouring spout connected to an animal-actuable valve which projectes substantially beyond the side surface of the container. Mounting means are engageable with the container for fastening same to the sidewall of an animal cage or the like.

Patented Sept. 22, 1970 3,529,575
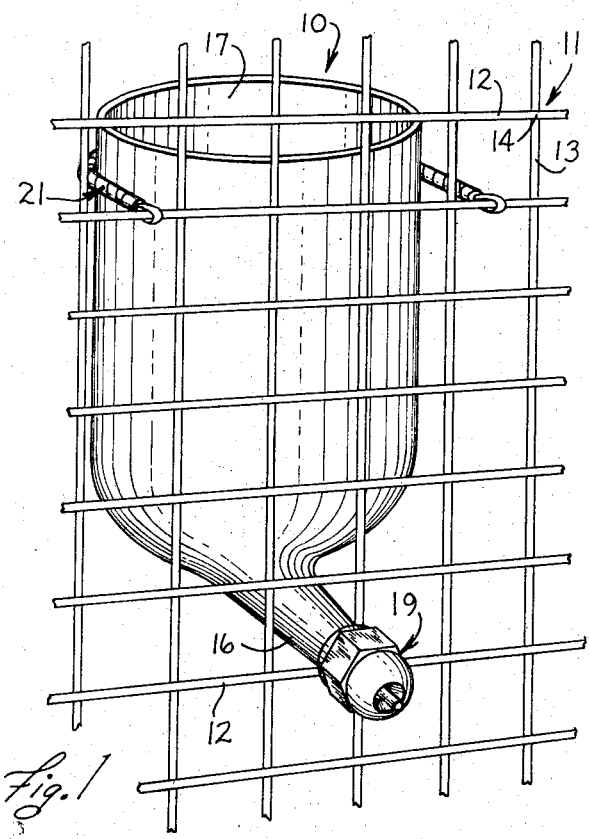
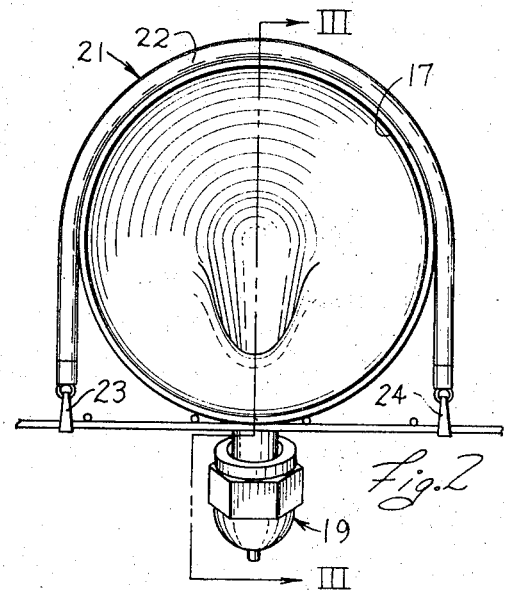
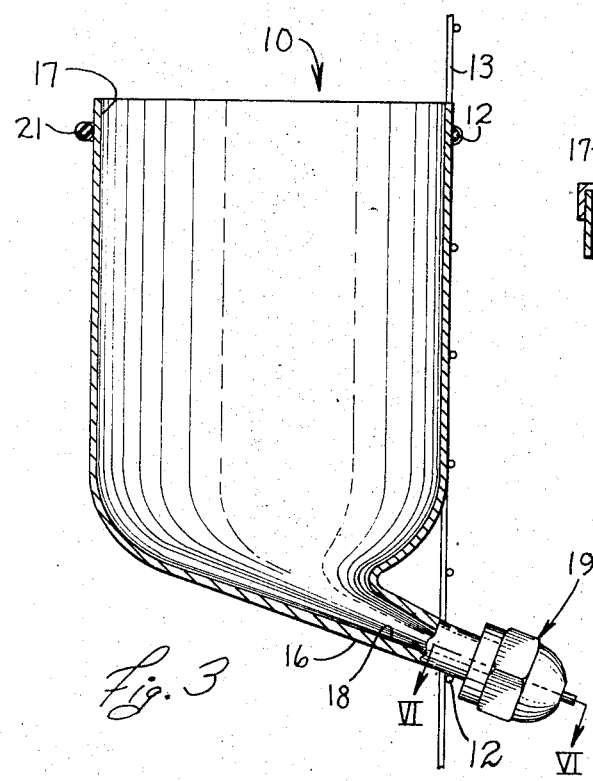
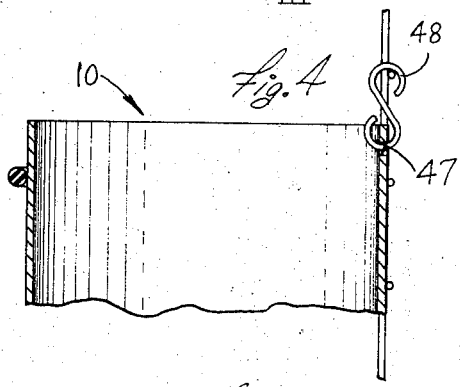
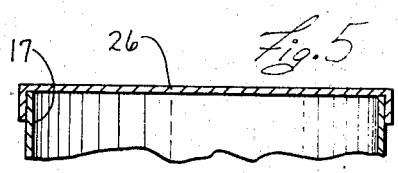
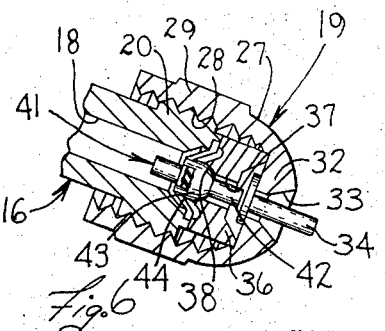
INVENTOR.
THOMAS G. SCHALK.
BY
Woodhams, Blanchard & Flynn
ATTORNEYS

“ANIMAL DRINKING BOTTLE”

BACKGROUND OF THE INVENTION

This invention relates in general to a container having animal-actuable valve means for supplying a liquid to a small animal and, more particularly, to a type thereof which can be easily refilled while mounted upon the side of an animal cage for servicing the animal or animals within the cage.

Animal-actuated valve devices connected to a source of liquid for supplying such liquid to animals are well known and widely used. As a general rule, the animal-actuated or drinking valves are connected to the liquid supply by pipes which are part of a substantially permanent installation. Accordingly, the cages for the animals must be located in substantially precise positions relative to the liquid supply system, which is not always desirable. For example, circumstances often develop where animals being tested or treated should be isolated from other animals in a laboratory. Also, it is sometimes desirable to change the liquid or its ingredients for a specific animal without affecting the other animals being serviced by the entire system. Moreover, there are numerous occasions where a simple liquid supply system is desired for demand feeding and wherein the more complicated permanent system is either not desired or is too costly to install.

An example of an existing type of liquid supply system of the substantially permanent type is disclosed in patent application Ser. No. 692,837 entitled Animal Drinking Valve with Two-Piece Stem, now U.S. Pat. No. 3,513,811, also assigned to the assignee of this application. This application also discloses an animal-actuable drinking valve having structure adaptable for use with this invention.

Accordingly, a primary object of this invention is the provision of a liquid container having an outlet equipped with an animal-actuable valve and capable of being mounted quickly and easily upon the animal cage and also capable of being quickly and easily refilled in the mounted position.

A further object of this invention is the provision of an individualized means of supplying liquid upon demand to a relatively small animal confined within a cage and including a portable container equipped with an animal-drinking valve, both of which can be easily cleaned and sterilized.

SUMMARY OF THE INVENTION

The objects and purposes of the invention, including those set forth above, have been met by providing an upwardly opening container having a downwardly and sidewardly extending spout which terminates in an animal-actuated valve. Mounting means engage the container and hold it firmly with respect to the wall of a cage, for example, containing the animal to be serviced by the drinking bottle. In such position of use, the valve extends through the wall of the cage for operation by the animal.

Other objects and purposes of the invention will become apparent to persons familiar with this type of equipment upon reading the following descriptive material and examining the accompanying drawings, in which:

FIG. 1 is a perspective view of an animal drinking bottle embodying the invention and attached to the wall of an animal cage.

FIG. 2 is a top plan view of said drinking bottle.

FIG. 3 is a sectional view taken along the line III—III in FIG. 2.

FIG. 4 is a fragment of FIG. 3 illustrating a modified support for the drinking bottle.

FIG. 5 is a fragment of FIG. 3 illustrating a cover for the drinking bottle.

FIG. 6 is a sectional view taken along the line VI—VI in FIG. 3.

For convenience in description, the terms "upper", "lower", "front", "rear" and words of similar import will have reference to the drinking bottle of the invention and the valve attached thereto as appearing in FIG. 3 in which the front of the bottle is on the right side. The terms "inner", "outer" and derivatives thereof will have reference to the geometric center of said drinking bottle and parts thereof.

DETAILED DESCRIPTION

The animal drinking bottle 10, a preferred embodiment of which is illustrated in FIG. 1, is provided for easy mounting on the sidewall of a conventional animal cage 11. Although the animal drinking bottle 10 may be utilized with nearly any type of animal cage, the cage 11 is shown as being constructed of a plurality of transverse wire rods 12 and 13 which are welded at the contact points such as 14.

The animal drinking bottle 10 (FIG. 3) may be constructed of any suitable material such as plastic, glass or metal, and has a downwardly and sidewardly extending spout 16 with an opening 18 extending therethrough. A valve assembly 19, which may be similar to the type illustrated in said patent application Ser. No. 692,837, is mounted on the extended end of the spout 16, which end is externally threaded at 20 (FIG. 6).

The animal drinking bottle 10 (FIG. 1) may be mounted for use by extending the valve assembly 19 and the spout 16 through an opening in the sidewall of cage 11 so that the spout 16 can rest upon a horizontal wire rod 12. The bottle 10 may be held in place against the sidewall of cage 11 by a support 21 (FIG. 2) comprising an elastic band 22 which extends around the bottle 10 and has a pair of end hooks or snaps 23 and 24 which are hooked over one of the horizontal wire rods 12.

The bottle 10 has an upwardly facing opening 17 through which it may be filled with the liquid. A cover 26 (FIG. 5) may be used to close opening 17 thereby preventing contamination.

The valve assembly 19 (FIG. 6) comprises a body part 27 having a large, rearwardly opening cavity 28 with an internally threaded, peripheral wall 29 engageable with the threads 20 on the spout 16. The front end wall 32 of cavity 28 has a frontwardly diverging opening 33 through which the front valve stem 34 projects. A valve insert 36, having a central opening 37 with a valve seat 38 at the rearward end thereof, is held between the front wall 32 and the front end of the spout 16.

A valve device 41 includes said front stem 34 and the rear stem 42, which extends through the opening 37 in insert 36. A valve head 43, preferably of elastomeric material and having an integral, radial flange 44, is mounted upon rear stem 42 for sealing engagement with the seat 38. The flange 44, which is perforate, is clamped between the insert 36 and the spout 16 so that it yieldably urges the valve head 43 into the closed position. The animal may operate the valve assembly 19 when it desires the liquid by moving the stem 34 either axially, rearwardly or radially, thereby causing the rear stem 42 to unseat the valve head 43 and permit the liquid to pass between the valve head 43 and the seat 38. For further details of the structure and/or operation of valve assembly 19, reference is made to said patent application Ser. No. 692,837.

An alternate means of supporting the bottle 10 is illustrated in FIG. 4. The sidewall of the bottle 10 is provided with one or more openings 47 near the upper edge through each of which a double hook hanger 48 may be inserted. The hanger 48 is then hooked over one of the horizontal wire rods 12 thereby supporting the bottle 10 on the sidewall of the cage 11.

Although particular preferred embodiments of the invention have been disclosed above for illustrative purposes, it will be understood that variations or modifications thereof, which lie within the scope of the appended claims, are fully contemplated.

I claim:

1. An animal-actuated dispenser adapted to be mounted adjacent an upright wall of a cage with a portion of the dispenser extending through an opening in said wall for furnishing liquid to a small animal confined within the cage, comprising:

a hollow container defining therein a reservoir for a liquid, said container having an opening adjacent the upper end thereof for permitting the reservoir to be filled with said liquid;

a spout integral with the container adjacent the lower end thereof, said spout extending downwardly and sidewardly relative to the container with the free end of the spout being normally positioned laterally outwardly relative to the sidewall of the container, whereby said container is positionable adjacent one side of said wall with the spout extending through the opening in said wall; and animal-actuatable valve means mounted on the free end of the spout for controlling the flow of liquid through the spout. said valve means including a valve member movable relative to the spout between open and closed positions for controlling flow of liquid through the spout.

2. A dispenser according to claim 1, wherein the opening at the upper end of the container is arranged for filling said container with liquid without disturbing the position of the container relative to said upright wall; and cover means removably supported on said container for closing said opening.

3. A dispenser according to claim 1, further including support means engaging said container for mounting the container upon and substantially adjacent said one side of said wall, said support means having means thereon adapted to engage said wall for holding the sidewall of the container closely adjacent the upright wall whereby the spout extends through the opening in the wall so that the valve means is disposed within the cage.

4. In combination with a cage adapted for confining an animal therein, said cage having an upright wall with an opening therethrough, an animal-actuated dispenser for furnishing liquid to an animal confined within the cage comprising:

a hollow container defining therein a reservoir for containing a liquid, said container having an opening adjacent the upper end thereof for permitting the container to be filled with liquid;

a spout integral with the container adjacent the lower end thereof, said spout extending downwardly and sidewardly relative to said container and having a flow passage therethrough in communication with the reservoir;

actuatable valve means mounted on said spout adjacent the free end thereof for controlling the flow of liquid through said passageway, said valve means having a portion thereof disposed laterally outwardly beyond the sidewall of the container for permitting said portion of said valve means to extend through the opening in said wall when the container is disposed adjacent the wall; and support means engaging said container for holding the sidewall of the container closely adjacent and substantially parallel with the upright wall of said cage with said portion of said valve means extending through the opening in said wall for permitting actuation of said valve means by an animal confined within the cage.

5. The combination according to claim 4, wherein the opening at the upper end of the container is arranged for filling the reservoir with liquid without disturbing the position of the container relative to said upright wall; and cover means removably supported upon the upper end of said container for closing the opening therein.

6. The combination according claim 4, wherein said wall of said cage is comprised of a plurality of wire rods interconnected to define a plurality of openings and said valve means is insertable through any one of said openings; and wherein said support means comprises an elongated elastic element having hook means on the opposite ends thereof engageable with said wire rods when said elastic element extends around said container under tension.

7. The combination according to claim 4, wherein said wall of said cage comprises a plurality of wire rods interconnected to define a plurality of openings through which said valve means can extend;

wherein said container has a hook opening in the sidewall thereof substantially directly above said valve means; and wherein said support means comprises double-hook means engageable with one of said wire rods and insertable through said hook opening in said container.